United States Patent Office 3,579,372
Patented May 18, 1971

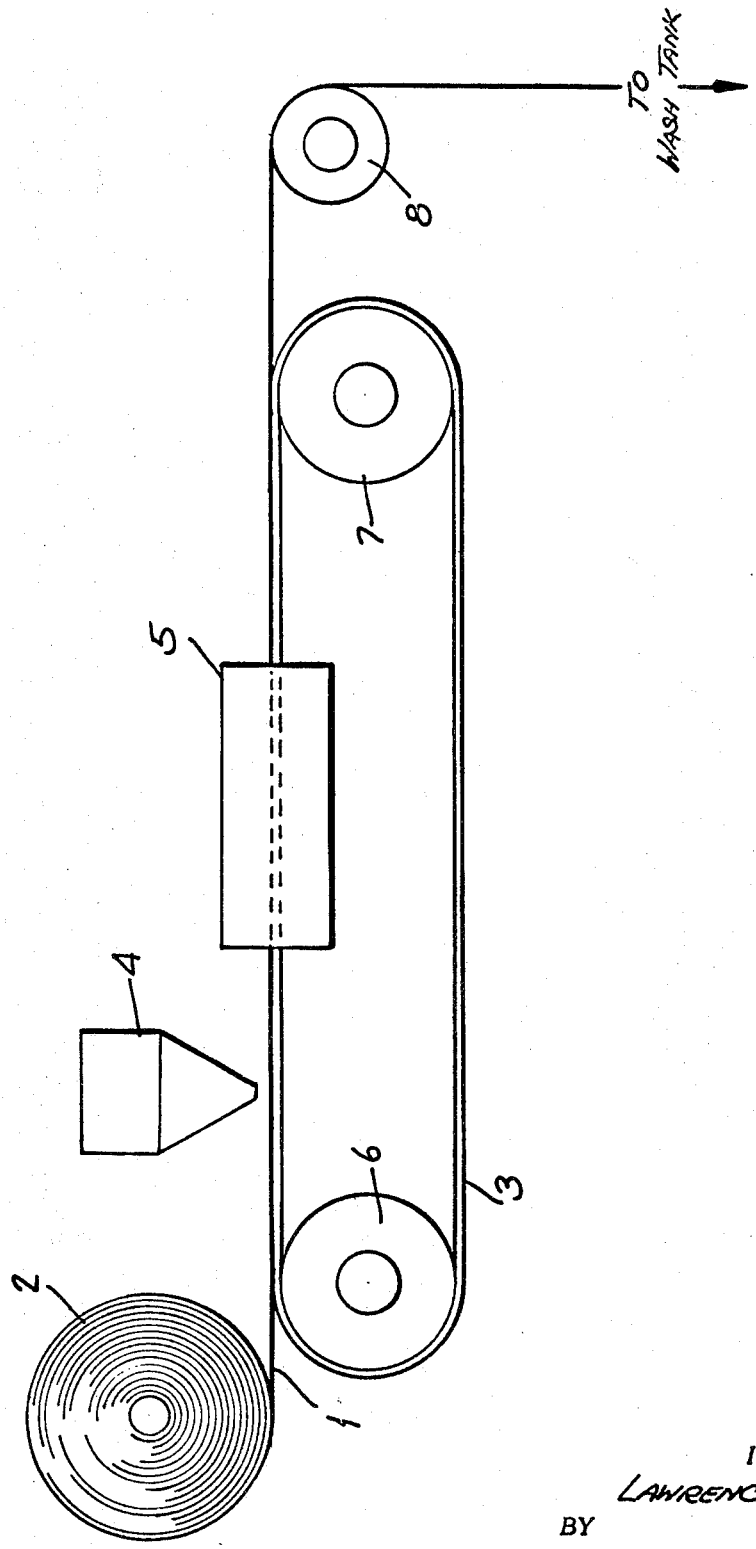

3,579,372
DEPOSITION OF MICROPOROUS FILM EMPLOYING DIELECTRIC HEATING
Lawrence W. Healy, Glen Rock, N.J., assignor to Genset Corporation, Newark, N.J.
Filed Dec. 4, 1968, Ser. No. 780,987
Int. Cl. B44d *1/50, 1/092*
U.S. Cl. 117—93.1          6 Claims

ABSTRACT OF THE DISCLOSURE

Describes procedure for deposition of microporous grain layer in and on a substrate for the production of leather replacement products in which a substrate which is coated with a solution of a polymer and wetted with water is exposed to dielectric heating to vaporize the water. The vapors mix with the organic solution and effect deposition of the polymer.

BACKGROUND OF INVENTION

This invention is concerned with the integral deposition of vapor permeable polymeric films in and on a flexible substrate. More particularly, it is concerned with improved procedures for depositing the grain layer on substrates so as to produce products which are useful as replacements for natural leather in a variety of applications. In preferred embodiments of the invention the polymeric film is deposited on fibrous substrates.

Major advances have been made in recent years in the production of leather replacement products ... so called artificial leathers. These products are now available in a large number of grades which are suitable for use as shoe uppers, garments, upholstery coverings, handbags and the like. Many of these products comprise a thin, elastomeric, breathable film on a flexible fibrous substrate. Normally the film is deposited on the substrate by precipitation from an organic solution by the addition of an inorganic liquid which is miscible with the solvent, but which does not dissolve the polymer.

The process of precipitating polymer molecules from solution by introducing a non-solvent liquid for the polymer, which is miscible with the solvent of the solution, is well known. However, for the production of leather-like products it is desirable that the polymer deposit from its solution as a uniform microporous film which is substantially free of macro-voids. Microporous films, as the term is used in the art and as it is used in this application are cellular films in which cells are so small that they are generally not visible to the naked eye and their presence in films which are components of artificial leathers will have deleterious effects on aesthetic properties and on physical properties such as flex, tear strength, and the like, in the finished product.

A number of procedures have been devised in attempts to deposit microporous films which are substantially free of macro-voids. None of them are completely satisfactory. The best known of these methods are:

(1) Exposing the wet film of polymer solution in an organic solvent to a humid atmosphere, e.g. a wet film of a dimethyl formamide solution of a polyurethane elastomer to an aqueous atmosphere having a controlled relative humidity. This is followed by bathing in a non-solvent such as water.

(2) Adding water or other non-solvent to the organic solution of the polymer to convert the solution to a colloidal dispersion. The amount of non-solvent added is carefully controlled so that the polymer does not form a gel. The suspension is coated on the substrate as a wet film and deposition is completed by bathing in a non-solvent bath.

(3) Adding a sufficient amount of water or other non-solvent to the polymer solution so as to form a gel. The gel is separated and coated on the substrate. Deposition is completed by bathing the coated substrate in a non-solvent bath.

(4) Forming a wet film of polymer solution on a substrate and thereafter bathing the coated substrate with a mixture of an organic solvent for the polymer and a non-solvent for the polymer which is at least partially miscible with the organic solvent.

All of these methods are followed by a step in which the product is washed in additional non-solvent so as to remove substantially all of the solvent. The product is then dried.

These procedures are capable of producing microporous films substantially free of macro-voids, but the procedures are not free of drawbacks. The principal disadvantages are these:

(1) The first method required a long processing time for the deposition of a suitable film, and this adds to the cost of the procedure. Expensive air conditioning equipment is also necessary in order to control the relative humidity.

(2) With the second method, the determination of the end point between the formation of the colloidal dispersion and the gel point is often quite difficult especially because of the tendency of the end point to vary appreciably from batch to batch of what are, apparently, the same polymers. This often leads to the production of final products with less than optimum physical properties. In extreme cases the solution may even be rendered useless.

(3) With the third method the necessity of separating the gel adds to the cost of the procedure. Additionally, the viscosity of the gel is often so high as to cause difficulties in the coating operation.

(4) In the fourth method the relatively high quantity of organic solvent which is employed often causes deleterious effects on the substrate by softening or even dissolving some of its components. Additionally the use of such relatively large quantities of organic solvent increases the cost of the operation and may cause operational hazards.

In view of these difficulties the art has long sought a facile, economic procedure for the preparation of microporous, elastomeric films suitable as grain layers in leather replacement products. This invention provides such a method.

Before describing the invention in more detail it will be convenient to define certain of the terms which will be employed.

Fiber.—Natural and synthetic materials of suitable denier, length and other dimensions such as polyesters, acrylics, polyamides, modacrylics, vinyls, cellulosics, wool, silk, etc. Inorganic fibers such as glass are included, but the preferred fibers for the preparation of leather-like compositions are normally organic fibers. They can be polyamides, such as polyhexamethylene adipamide (nylon 66) or polycaproamide (nylon 6); polyesters, such as polyethylene terephthalate or polydimethylcyclohexyl terephthalate; acrylics such as polyacrylonitrile; vinyls, such as polyvinyl chloride or polyvinyl alcohol; cellulosics such as rayon, etc., and wool. Mixtures of two or more fiber types may be employed.

As used herein, the term "fiber" includes tow, staple, continuous filament and similar fiber forms. The fibers may be present as yarns. They may be crimped (whether or not heat-set) or uncrimped. For the preparation of various substrates fibers employed may generally have a denier between about 0.5 and 6 and preferably between 0.5 and 3. Fiber lengths of at least about ½ inch are desirable. Fibers in conventional textile lengths, e.g. up to three or more inches, are generally suitable for the preparation of fibrous substrates.

As used herein "fiber" refers to a product which is at least 500 times as long as it is wide. This will distinguish fibers from particles which normally do not have any one dimension appreciably greater than another dimension, and are often essentially spherical.

Fleece.—The structure formed by processing the fibers in the appropriate equipment including, for example, carding, cross-laying, air-laying, etc. Excellent substrates for use in this invention are prepared from isotropic fleeces such as may be formed on air-lay equipment. However, a cross-laid fleece in conjunction with other directional structures such as carded fleeces, scrim, warp yarn, and the like, can also be employed to prepare substrates. Isotropic continuous filament structures are also suitable.

Foam.—Relatively low density, porous, cellular, flexible, resilient materials. Polyurethane foam is preferred for the preparation of substrates, although rubber latex, vinyl foams and other foams having properties similar to polyurethane foams may also be used.

Web.—The product formed by combining the fleece and the foam as by needling the fleece into the foam. Reference will also be made to composite webs in which there are at least two fleece components.

Substrate.—The product formed by depositing an elastomer throughout the web. Composite substrates are formed from composite webs by elastomeric deposition.

The term "substrate" is used herein in two different senses. It is employed in the generic sense to refer to any base which is used in association with the grain layer of the invention. It is also used in the more restricted sense of the three component fiber-foam-elastomeric filler substrate which is defined in the previous paragraph. It is not believed that this will cause any confusion.

Grain layer.—The term "grain layer" is used in association with the description of this invention to describe that portion of the total structure which is analogous to the grain layer of natural leather. The grain layer may be prepared from the same elastomers used to prepare the substrates or composite substrates.

Solvent.—The liquid used to dissolve the polymer which will deposit, precipitate or coagulate to form the grain layer.

The foregoing rather specialized definitions are especially useful in defining the preferred leather replacement products which can be prepared in accordance with this invention in which an elastomeric film is deposited as a grain layer in the upper strata and above the surface of a fibrous substrate comprising randomly oriented fibers entangled and interlocked with each other.

THE INVENTION

This invention provides a method by which it is possible to deposit a vapor permeable, breathable grain layer on a suitable substrate utilizing water as the deposition or coagulating liquid. This is a most unexpected discovery since previous attempts to use liquid water alone have not produced satisfactory products. In fact, it has been the inadequacy of water as a precipitation medium which has led to the development of the procedures described above. A special advantage of this invention is that the grain layer is deposited in and on the substrate rather than as a laminar layer on the surface of the substrate. This improves the aesthetic appearance of the product, and also improves its physical properties, especially the resistance to delamination.

In accordance with this invention a vapor permeable, breathable, polymeric grain layer is deposited in and on a leather replacement product substrate by wetting the substrate with water, coating the top surface with a solution of the polymer in a solvent and dielectrically heating resulting coated substrate to vaporize the water. The water vapors contact the bottom of the polymeric coating and dissolve in the solvent thereby causing the polymer to deposit as a thin film having the desired characteristics. It is surprising to find that the film which deposits is substantially free of macro-voids.

Dielectric heating is a relatively new development in which high frequency electric energy, generally in the range of 10 to 40 mc. is used to generate heat in materials that are relatively poor conductors. The procedure is employed quite widely in the paper industry to dry paper. Dielectric heaters suitable for drying are commercially available. These commercially available machines are useful in the practice of this invention. As provided, the amount of energy produced can be controlled, and this feature of the machines is useful in the practice of this invention since the rate at which the water vaporizes can be controlled within desirable limits so as to assist in optimizing the quality of the grain layer.

The drawing is a schematic illustrating one method of practicing the invention. In the figure substrate 1 which has been previously wet with water is led from supply roll 2 to support belt 3 and then past polymer solution supply station 4 where it is coated with a wet film of solution. Belt 3 is an endless belt guided and driven by rolls 6 and 7. It is not essential that the substrate be supported, but it is best to do so. The coated supported substrate is guided through dielectric heater 5 and then over roll 8 to a wash tank where the solvent is washed out of the deposited grain layer. The product is finally dried.

The elastomers utilized for the grain layer in the practice of this invention may be selected from a relatively large number of products which are commercially available or can be prepared by known methods. They can, in fact, be the same elastomers which have been utilized in the preparation of products in accordance with the four procedures set forth above. The selected elastomer will be tough, flexible, abrasion resistant, not subject to cold flow, solvent resistant and capable of deposition as a microporous breathable layer with moisture vapor transmission properties similar to those of natural leather. In the microporous film the cells will be very small, generally of an order such that they are not visible even at 100× magnification. They will form an intercommunicating system in which a large proportion of the cells open on one or more of their neighbors. The cells communicate with each other and with both surfaces. This does not preclude the possibility that the deposited elastomer will contain some closed cells.

A convenient test for the initial evaluation of potential elastomers as films or grain layers is to deposit the elastomer from a solution by the addition of an immiscible non-solvent. Typically a dimethyl formamide solution of a polyurethane elastomer containing about 20% elastomer is treated with a 70:30 dimethyl formamide-water solution to test deposit the elastomer. If the elastomer deposits as a film, this is an indication that the elastomer is in the correct molecular weight range. The film should dry to a substantially uniformly opaque microporous layer which retains its opacity indefinitely. The development of transparency indicates that the micropores of the film have collapsed demonstrating that the molecular structure is not sufficiently rigid to produce a satisfactory film.

If the dry opaque film appears to be of adequate rigidity, it is next tested for moisture vapor transmission. Moisture vapor transmission can be tested by placing 10 ml. of water in a flanged cup known as the Payne Permeability Cup. The film is placed over the cup and held in place by clamping it between a circular ring and the flange of the cup. The loaded cup is then placed in a desiccator over anhydrous calcium chloride at substantially constant ambient temperature. The cup is reweighed at the end of 24 hours to determine the weight of water which has permeated through the test film and is thus lost from the cup. This value is recorded as the moisture vapor transmission. The test is a standard test known as the Payne Permeability Test. Elastomers suitable for use in this invention will produce a 10 ml. thick particle-free film having a density of from about 20 to 60 pounds per cubic foot and a moisture vapor transmission of from about 100 to 200 mg./cm.$^2$/24 huors.

The same test may be employed to determine the moisture vapor transmission properties of the leather replacement products prepared in accordance with the invention. It should be noted, however, that the values obtained will vary somewhat depending on whether the grain layer or the opposite side of the product faces the water.

The preferred polymers for use in the invention are polyurethanes. These are a well-known class of elastomers obtained by reaction between organic polyisocyanates and an active hydrogen containing material such as polyethers and polyesters with a plurality of hydroxyl groups on the polymer chain. Dihydroxy compounds are preferred. The reaction is carried out by reacting the hydroxyl terminated compound with a molar excess of organic isocyanate to produce an isocyanate terminated prepolymer. The prepolymer is then reacted with a chain extending compound such as water, active hydrogen containing amino compounds, amino alcohols, or diols such as n-butane-diol, ethylene glycol, propylene glycol, and the like.

Suitable chain extenders include water, hydrazine, N-methyl-bis amino propylene, dimethyl piperazine, 4-methyl-m-phenylene diamine, diaminopiperazine, ethylene diamine. Mixtures of chain extending agents can also be employed.

The prepolymer can be prepared by first mixing a molar excess of the polyisocyanate with the active hydrogen containing polymeric material and heating the mixture at about 50–120° C. Or, the polyisocyanate can be reacted with a molar excess of the active hydrogen containing polymeric material, and the reaction product capped by reacting it with more isocyanate.

Aromatic, aliphatic and cycloaliphatic isocyanates or mixtures thereof can be used in forming the prepolymer. These include, for example, tolylene-2,4-diisocyanate; tolylene-2,6-diisocyanate; m-phenylene diisocyanate biphenylene 4,4'-diisocyanate; methylene bis-(4-phenyl isocyanate); 4-chloro-1,3- phenylene diisocyanate; naphthalene - 1,5-diisocyanate; tetramethylene-1,4-diisocyanate; hexamethylene - 1,6-diisocyanate; decamethylene-1,10-diisocyanate; cyclohexylene - 1,4 - diisocyanate; methylene bis(4-cyclohexyl isocyanate) and tetrahydronaphthalene diisocyanate. Arylene diisocyanates, that is isocyanates in which the isocyanate groups are attached to an aromatic ring, are preferred. In general, they react more readily than do alkylene diisocyanates.

Polyalkylene ether and ester glycols are preferred active hydrogen containing polymeric materials for the prepolymer formation for reasons of availability and economy. The most useful polyether glycols have a molecular weight of 300 to 5000, preferably 400 to 2000, and include, for example, polyethyleneether glycol, polypropylene ether glycol, polytetramethyleneether glycol, polyhexamethyleneether glyocl, polyoctamethyleneether glycol, polynonamethyleneether glycol, polydecamethyleneether glycol, polydodecamethyleneether glycol, and mixtures thereof. Polyglycols containing several different radicals in the molecular chain such as, for example, the compound $HO(CH_2OC_2H_4O)_n$ wherein $n$ is an integer greater than 1 can also be used.

Polyester glycols which can be used in conjunction with the polyalkylene ether glycols may be produced by reacting acids, esters or acid halides with glycols. Suitable glycols are polymethylene glycols, such as ethylene-, propylene-, tetramethylene-, decamethylene glycols, substituted polymethylene glycols such as 2,2-dimethyl-1,3-propanediol, cyclic glycols such as cyclohexanediol and aromatic glycols such as xylylene glycol. Aliphatic glycols are generally preferred when maximum product flexibility is desired. These glycols are reacted with aliphatic, cycloaliphatic or aromatic dicarboxylic acids or lower alkyl esters or ester forming derivatives thereof to produce relatively low molecular weight polymers, preferably having a melting point of less than about 70° C., and molecular weights like those indicated for the polyalkyleneether glycols. Acids suitable for preparing such polyesters are, for example, succinic, adipic, suberic, sebacic, terephthalic and hexahydroterephthalic acids and the alkyl and halogen substituted derivatives of these acids.

The chain extension reaction may be carried out at a temperature up to about 80° C., but is usually effected at about room temperature, i.e. 25° C. to 35° C. During the reaction, prepolymer molecules are joined together into a substantially linear polyurethane polymer, the molecular weight of which is usually at least 5000 and sometimes as high as 300,000. The reaction can be carried out without a solvent in heavy duty mixing equipment or it can be carried out in a homogeneous solution.

Since the resulting polyurethane polymer has rubber-like elasticity, it is referred to as an "elastomer," although the degree of elasticity and rubber-like resilience may vary widely from product to product depending on the chemical structure of the polymer and the materials in combination with it.

Polyvinyl chloride may be used in conjunction with the polyurethane described above. When making a flexible shoe upper material or the like from a blend of polyurethane elastomer and polyvinyl chloride polymer, it is often preferred to employ a major proportion (over 50 weight percent) of the former and a minor proportion (less than 50 weight percent) of the latter. However, useful films are also obtainable in accordance with this invention when the elastomer blend contains a major proportion (at least 51% by weight) of polyvinyl chloride.

Various additives such as stabilizers, coloring agents, plasticizers, and the like, can be added to the elastomer solution to enhance the properties or appearance of the final product.

As stated above, the preferred solvent for the preparation of the elastomer solution is dimethyl formamide because of its high solvent power and because it is miscible with water. However, other solvents and solvent blends can also be employed. Dimethyl formamide and methyl ethyl ketone in various proportions form useful solvents for use in association with water. The criteria for selecting the solvent or solvent blend are that they should dissolve the elastomer and be at least partially miscible with water.

The process of this invention is applicable to the flexible, porous, fibrous substrates which have heretofore been suggested for use with the methods of elastomeric film deposition described above. It is especially well adapted for use with the substrates and composite substrates described and claimed in copending and commonly assigned patent application Ser. No. 734,887, the teachings of which are incorporated herein by reference. For purposes of illustration this invention will be described as applied to the preparation of leather replacement products utilizing the preferred composite substrates described in that application.

The preferred composite substrates described in that application are three component foam-fiber-filler combinations. They are prepared by a process in which a fleece is needled into a foam to form a base web. A top fleece which comprises a pair of fibers one of which is thermoplastic is then needled into the base web to form a composite web. The denier of the fibers in the top fleece may be as large as that of the fibers in the bottom fleece, but is never larger. The composite web is then subjected to a pressure treatment at elevated temperature. Normally the treatment is effected at about 250° F. to 375° F. at a pressure of about 5 to 100 pounds per square inch during a period of from 20 seconds to five minutes.

The compressed composite web next is impregnated with a solution of elastomeric filler material, preferably a polyurethane elastomer and the filler deposited within the web. This may be accomplished by bathing the impregnated composite web in a liquid which is miscible with the solvent of the solution, but does not dissolve the elastomer. The elastomer may be any of those described above in connection with the description of elastomers suitable for the formation of a grain layer.

The composite substrate with the deposited elastomeric filler may then be dried, buffed and subjected to a mild heat treatment at about 300° F. to 350° F. at from 2 to 5 pounds per square inch pressure from about 10 to 30 seconds.

The thus formed composite substrate is especially preferred for use in this invention. It may be defined as a breathable, fibrous sheet composition having a gradient density increasing from bottom to top comprising a base web which is an interlocking network of randomly oriented and distributed fibers in a polyurethane foam with void spaces therebetween; a top fleece comprising a plurality of additional fibers bonded together at spaced apart points, said fleece being mechanically bonded to the surface of said base web, the denier of said additional fibers being no greater than the denier of the randomly oriented fibers, the additional fibers having fine interstices between them and being predominantly in a horizontal plane; and a soft, resilient elastomeric filler which substantially, but not completely fills the void spaces and interstices.

The composite web typically contains about 10% to 80% fibers and 20% to 90% foam based on the total weight.

The dry elastomeric filler content of the substrate is from about 25% to 75%, by weight, the foam content about 10% to 60%, by weight, and the fiber content from about 5% to 55%, by weight, all based on the total weight of the composition. The weight of the top fleece in a composite substrate is typically about 10% to about 25% of the total weight of the composite substrate. With the usual commercially available fibers in the usual denier range the weight of thermoplastic fibers in the top fleece is from about 15% to 50%, by weight, based on the total weight of fibers in the top fleece.

A fiber is "thermoplastic" within the meaning of the term as used herein if it softens sufficiently under the heat and pressure treatments described above to form a bond with itself or with other fibers at cross-over points on cooling. Typical fibers which are within this definition include polyvinyl chloride fibers such as Vinyon, polyesters such as Fortrel, acrylics, olefins, modacrylics, acetates and triacetates.

As stated above, the preferred foams are polyurethane foams. This is because they are readily available, easy to work with, tough and abrasion resistant. They are prepared in accordance with known procedures by reaction between hydroxylated polyethers, polyesters and similar compounds, and organic polyisocyanates in the presence of foaming agents such as water and liquid halogenated hydrocarbons.

Flexible, cellular polyurethanes as the term is commonly used in the art, are foams which give an ultimate elongation of at least about 100% at room temperature and have the ability to deform readily under a load. Typical foams which are useful in the practice of this invention are those requiring a compression of about 3 to 100 pounds per 50 square inches to produce a 25% deflection, measurements being made on a two inch thick sample at 25° C. in accordance with ASTM test number 1564–59T for indent load deflection. The foam sheet will preferably have a tensile strength of between about 5 to 35 p.s.i., an ultimate elongation between about 100 and 400% and a tear strength of about 0.6 to 5 pounds per inch. The preferred foams will also have between about 25 and 100 cells per linear inch and a density of the order of about 0.8 to 6 pounds per cubic foot.

The flexible cellular polyurethane employed in the practice of this invention is prepared by the reaction of an organic polyisocyanate with an organic compound having at least two isocyanate-reactive hydrogen atoms. Preferably, the organic compound having at least two reactive hydrogen atoms will have a molecular weight of at least 200. It can be a polyalkylene polyether prepared by polymerizing an alkylene glycol or alkylene oxide. The useful polyethers include polyethylene glycol, polypropylene glycol, polytetramethylene glycol, copolymers of glycols with triols such as 1,2,6-hexanetriol or trimethylol propane, copolymers of two or more oxides, such as ethylene oxide-propylene oxide copolymers, etc. It can also be a polyester such as those prepared by reacting ethylene glycol, propylene glycol, tetramethylene glycol, hexanetriol, trimethylol propane and polymers thereof with dicarboxylic acids such as those derived from castor oil, tall oil fatty acids, and other fatty acids; or dicarboxylic acids such as adipic acid, succinic acid, maleic acid, phthalic acid, etc.

Useful organic polyisocyanates include arylene diisocyanates or triisocyanates, typically tolylene diisocyanate, phenylene diisocyanate, tolylene triisocyanate, benzidine diisocyanate, mesitylene diisocyanate, durylene diisocyanate, naphthalene diisocyanate, etc.; aliphatic polyisocyanates, typically hexamethylene diisocyanate, 4,4′-methylene bis-cyclohexyl isocyanate, decamethylene diisocyanate, etc. The preferred polyisocyanates are the arylene diisocyanates and particularly the commercially available 80,20 mixture of 2,4 and 2,6-tolylene diisocyanates.

The cellular polyurethanes are prepared by reacting an organic polyisocyante, typically tolylene diisocyanate with the organic compound having reactive hydrogen atoms in the presence of a gas-producing agent. The gas-producing agent may be water, which reacts with the isocyanate to form carbon dioxide, or it may be inert, volatitle liquid or a gas. Additional components such as cell-modifiers, emulsifiers, dyes, etc. may also be present.

The preferred cellular polyurethanes are flexible cellular polyether or polyester urethanes. They may have an open-cell or closed-cell structure, but open cells are preferred. The term "open-cell" means that at least about 90% of the cells are interconnecting and free of cell-separating membranes. Open-cell cellular polyurethanes can be prepared by suitable foaming techniques or by chemically, mechanically or explosively opening the cells of a closed cell foam.

After the foam is prepared, generally in the form of a bun, it is formed into sheets suitable for use in this invention by any suitable technique such as slicing, splitting or peeling the bun. The thickness of the sheet may vary over a wide range depending upon the proposed ultimate product. For example, sheets from 0.020 to 1.5 inches may be employed. For shoe upper products the selected sheet thickness will normally be from about 0.020 to 0.125 inches.

Useful fillers or stuffing materials which may be employed in this invention include a wide variety of soft, resilient, thermoplastic or thermosetting materials including, for example polyurethanes and copolymers of butadiene and acrylonitrile. Polyurethane elastomers prepared from various polyethers or polyesters by reaction with polyfunctional isocyanates are especially preferred. They are prepared by known procedures utilizing the same basic chemicals utilized in the production of polyurethane foams as described above, but under conditions such that they normally do not foam. They may contain various surfactants, lubricants, and the like. They are a well known class of polymeric materials and are readily available from a number of commercial producers. Usually, they are commercially avialable in organic liquids such as dimethyl formamide.

The process of this invention can be repeated a number of times to increase the thickness of the grain layer. It is a special feature of the invention that the layer is not built up in discrete separate layers, but rather, because of the use of the method each superposed film merges with the previously deposited film so as to become integral with it.

In an especially preferred aspect of this invention at least one of the wet layers which is laid down on the substrate will contain dispersed particles. This aspect of the invention is disclosed and claimed in copending commonly assigned application Ser. No. 719,219, the teachings of which are incorporated herein by reference.

In accordance with the invention described in that application the elastomer solution is prepared to contain inert organic or inorganic particles varying in size from about 200 angstroms to 150 microns. The weight of particles in the solution varies from about 30 to 120 parts by weight of inert particles per 100 parts by weight of dry elastomer. The elastomer may be, for example, polyurethane or a polyurethane polyvinyl chloride blend such as has been described above. The preferred elastomeric films are prepared to contain from 50 to 80 parts by weight of inert particles having an average size of from 20 to 70 microns.

Typical of the organic and inorganic particles which may be employed in the invention are charcoal; aluminum dust and other metallic powders; leather dust; nylon; oxides of silica such as the dioxides; silicate compounds such as sodium aluminum silicate and magnesium aluminum silicate; and oxides of calcium and barium, such as barytes, and talc. These products are available commercially in suitable particle sizes, or may be purchased and ground to suitable sizes. Microporous, microcrystalline, resilient particles are preferred because of their ability to enhance the water absorption and moisture vapor transmission of products prepared utilizing them. Products prepared using them also have a more uniform cell structure in the grain layer. Microcrystalline, microporous, resilient cellulosic particles such as may be prepared by acid hydrolysis of cellulose, followed by mechanical shearing in a water slurry and drying are especially preferred. A typical process for the preparation of these particles is described in Industrial and Engineering Chemistry, vol. 54, No. 9, pages 20-29, September 1962. In order to distinguish these particularly preferred particles from other particles which can be employed in the practice of this invention. They are referred to herein as microporous, microcrystalline, resilient cellulosic particles. They are available commercially under the name Avicel from the Food Machinery Corporation.

Microcrystalline collagens such as those which are prepared from edible, bovine collagen as water insoluble acid salts are suitable. Similarly microcrystalline silicates such as the hydrated magnesium silicate which is obtained from chrysotile asbestos in the form of colloidal, rod shaped, submicron particles may also be employed. These products are available from Food Machinery Corporation under the names Avitene and Avibest, respectively.

The principal function of these particles is to mask "show-through." This is a problem in which irregularities of the substrate are apparent through the polymeric coating.

While the process of this invention is applicable to the preparation of a wide variety of leather like products including shoe uppers, it is preferred for the preparation of high quality shoe uppers, especially those with a smooth finish, to lay down a thin base grain layer by another deposition technique before applying the process of this invention to the preparation of the final product. Thus, a wet film of elastomer solution is laid down on a thin, flexible release surface such as silicone treated paper or a plastic film, suitably polyethylene or polypropylene. The coated release film is contacted with the surface of the substrate, and the whole package is passed through nip rolls and into a water bath. The base layer deposits as a smooth film and the release layer is peeled away. The substrate with the base layer is then washed with water to remove organic solvent. The water-wet base grain layer coated substrate is then further coated in accordance with this invention.

Typically the elastomeric solutions used to form the grain layers of this invention will contain from about 2% to about 45% by weight of elastomer based on the weight of the solution; and, as stated above, they may contain from about 30 to 120 parts by weight of inert particles per 100 parts by weight of elastomer.

The products produced are most useful as natural leather replacements and are normally from about 20 to 100 mils thick. The thickness of the finished grain layer above the surface will typically be from about 5% to 33% of the total thickness of the product, or from about 5 to 20 mils. As stated above the grain layer will extend into the substrate. The principal reason for this is that the elastomer solution is coated onto a water-wet substrate. This permits some diffusion into the substrate, but not too much. In this connection it should be noted that the amount of water in the substrate is maintained at a level such that there is no surface film of water, since this would tend to prevent penetration of the elastomer into the substrate.

This invention has been principally described as applied to three component filler-foam-fabric substrates. It is applicable to other substrates such as those described, for example, in United States Patents Nos. 2,910,763; 2,978,785; 2,723,935; 3,067,483; 3,238,055, and 3,000,757.

The following examples are given by way of illustration only and are not intended to be limitations of this invention.

EXAMPLE 1

Fibers of 100% 1.5 denier by 1.5 inch nylon 66 are air-laid on a webbing machine to produce a fleece of 3 oz./sq. yard. This fleece is integrated with a 0.025 inch thick sheet of polyester polyurethane foam having a density of approximately 1.5 lb./cubic foot, as follows:

(a) 600 penetrations per square inch from the fiber side (300 penetrations at $11/16$ inch depth, 300 penetrations at $9/16$ inch depth).

(b) 600 penetrations per square inch from the foam side (300 penetrations at $1/2$ inch, 300 penetrations at $7/16$ inch depth).

The web with the fiber side up is then brought into contact with a newly laid fleece of a 2:1 blend of 1.5 denier by 1.5 inch nylon 66 and 1.5 denier by 1.5 inch polyester fiber. The fleece density is 1.5 ounces per square yard. It is again passed through a needle loom with the fiber side up to produce a composite web. The penetration density of 600 penetrations per inch at $9/32$ inch depth.

The resulting composite web is compressed in a rotary press during a dwell time of one minute at a belt pressure of 5 lbs./sq. inch while applying heat to the fiber side at 315° F. to cause the ester fiber to bond to the nylon fiber at spaced apart points.

The composite web is then impregnated with a polyester polyurethane elastomer solution in dimethyl formamide having a 15% solids concentration, and passed through metering rolls so that the total wet add on is 500%. The elastomer is the reaction product of the ester of diethylene glycol and adipic acid, reacted with toluene diisocyanate to form a prepolymer which is then chain extended with p,p'-methylene. The product is sold as Helastic 1360. The impregnated web is next passed into a water bath so as to deposit the elastomer in the composite web. The product is washed with water, dried, buffed and then heat treated at 325° F. and three pounds per square inch pressure for twenty seconds.

The dried substrate is wetted in a water bath and squeezed so that no surface film of water remains. A solution containing 25% by weight of a polyester polyurethane elastomer is coated onto the surface to produce a film approximately 45 mils thick. The thus coated product is exposed to a dielectric heater for about 20 minutes, during which period the polymer deposits as a microporous grain layer. The dielectric heater employed is a 5 kw. B-dryer manufactured by the Fitchburg Industrial Products Division of Litton Industries. It is operated at one ampere.

The dimethyl formamide is washed out with water. The dried product is useful as a replacement for natural leather in shoe uppers.

The elastomer solution utilized in the preparation of the grain layer is prepared by reacting 74 parts by weight of polyethylene glycol adipate having a molecular weight of about 2000, terminal hydroxyl groups and an hydroxyl content of 1.5% at 100–110° C. for one hour with 19.75 parts by weight of p,p'-methylenediphenyl diisocyanate in dry dimethyl formamide and chain extending by reaction at 35° C. for one hour with 7.1 parts by weight of p,p'-methylene dianiline as a 30% solution in dimethyl formamide. The resulting solution contains about 25% by weight of the elastomer.

EXAMPLE 2

A polypropylene film is knife coated with a wet film 4 mils thick of the following composition:

| | Parts by weight |
|---|---|
| Polyurethane elastomer of Example 1 (25% in DMF) | 100 |
| DMF | 25 |
| Azo oil black dye | 0.15 |
| Avicel, Technical Grade | 16 |
| Colloidal Silica-Cab-O-Sil | 1.5 |

A composite substrate identical with the substrate of Example 1 is immersed in water and squeezed through nip rolls to a total wetting liquid add on of 60%. The surface of the composite substrate is free of any surface film of liquid. The wet substrate is laminated to the coated polypropylene by passing through nip rolls. The package thus formed is held in a water bath for about four minutes to deposit the elastomer. The polypropylene film is then removed.

This substrate with the base layer is treated in the same manner as the substrate of Example 1. The resulting product has the feel, hand, and appearance of natural leather. It is breathable and its moisture vapor transmission is in the range of the natural product. It is coated with patent leather finish and used as uppers in a pair of shoes.

EXAMPLE 3

The procedure of Example 2 is repeated except that the elastomer solution used to form the wet film on the base coated substrate is first treated with water to a level which is one third of that necessary to cause it to become cloudy (as separately determined with an aliquot). The properties of the product produced are similar to those of the product of Example 2, and it is similarly useful.

What is claimed is:

1. A method for forming a grain layer in a natural leather replacement product which comprises applying a solution of a polymer in a solvent which is at least partially miscible with water to the top surface of a substrate which is wet with water, dielectrically heating resulting coated substrate to vaporize said water whereby said vapors at least partially dissolve in said solvent to cause the polymer to deposit from solution, and thereafter washing with water.

2. A method as in claim 1 wherein the solvent is dimethyl formamide.

3. A method as in claim 1 wherein the polymer is a polyurethane elastomer.

4. A method as in claim 3 wherein the polyurethane elastomer is blended with polyvinyl chloride elastomer.

5. A method as in claim 1 in which the polymer solution contains from about 30 to 120 parts by weight of inert particles per 100 parts by weight of dry elastomer in the size range of from 200 Angstroms to 150 microns.

6. A method as in claim 5 wherein the particles are microporous, microcrystalline, resilient, cellulosic particles.

References Cited
UNITED STATES PATENTS

| 2,826,166 | 3/1958 | Davis | 117—93.1X |
| 3,282,726 | 11/1966 | Seligsberger | 117—142X |
| 3,413,179 | 11/1968 | Goy et al. | 28—75X |

ALFRED L. LEAVITT, Primary Examiner

E. G. WHITBY, Assistant Examiner

U.S. Cl. X.R.

117—135.5, 140, 143, 161; 28—75